United States Patent [19]

Sato et al.

[11] Patent Number: 5,528,380

[45] Date of Patent: Jun. 18, 1996

[54] APPARATUS AND METHOD FOR SYNCHRONIZING PICTURE SIGNALS

[75] Inventors: Koichi Sato; Yasuhiro Yamamoto, both of Tokyo, Japan

[73] Assignee: Asahi Kogaku Kogyo Kabushiki Kaisha, Tokyo, Japan

[21] Appl. No.: 224,776

[22] Filed: Apr. 8, 1994

[30] Foreign Application Priority Data

Apr. 9, 1993 [JP] Japan .................. 5-083318
Apr. 9, 1993 [JP] Japan .................. 5-083517

[51] Int. Cl.$^6$ ............................... H04N 5/937
[52] U.S. Cl. .................. 358/342; 348/455; 348/717; 358/909.1
[58] Field of Search .................. 358/335, 342, 358/310; 348/717, 455; H04N 5/937

[56] References Cited

U.S. PATENT DOCUMENTS

| | | | |
|---|---|---|---|
| 4,335,393 | 6/1982 | Pearson | 358/310 |
| 5,225,913 | 7/1993 | Sato | 358/316 |
| 5,287,226 | 2/1994 | Sato et al. | 358/341 |
| 5,416,510 | 5/1995 | Lipton | 348/717 |

*Primary Examiner*—Howard W. Britton
*Attorney, Agent, or Firm*—Greenblum & Bernstein

[57] ABSTRACT

An apparatus for synchronizing a plurality of signals forming a picture signal is provided. The plurality of signals include at least two types of signals, each having a predetermined time unit. The two types of signals are alternately outputted. The apparatus include separate memory devices for separately storing the two types of signals having predetermined time units. A memory control mechanism is provided for successively writing the two types of signals in a manner such that the writing operation is alternated between a first memory device and a second memory device of the separate memory devices so as to provide alternate blank memory areas in the first and second memory devices. Thus, the signals of the same type as those written in areas adjacent to the blank memory areas can be written in the blank memory areas.

34 Claims, 10 Drawing Sheets

APPARATUS AND METHOD FOR SYNCHRONIZING PICTURE SIGNALS

BACKGROUND OF THE INVENTION

1. Field of the Invention

The present invention relates to an apparatus and a method for synchronizing picture signals without using a delay circuit.

2. Description of Related Art

In a still video apparatus, such as a still video camera, color signals R, G and B having luminance signals Y obtained by a color image pickup device are separated, for example, into the luminance signals Y and line-sequential differential color signals LSC (R–Y, B–Y) for reproduction. The luminance signals Y and the line-sequential differential color signals LSC are FM-modulated by different carrier frequencies and are subject to a multiple recording together with a predetermined synchronizing signal and an ID signal, etc. Upon reproduction of the recorded signals, the luminance signals and the line-sequential differential color signals LSC are separated by a low bandpass filter and a high bandpass filter and are subject to predetermined operations including a demodulation to be outputted.

The line-sequential differential color signal LSC includes color difference signals R–Y and B–Y that are recorded in alternate horizontal scanning periods (1H). Accordingly, it is necessary to synchronize the color difference signals R–Y and B–Y with the luminance signals so as to reproduce a picture on a monitor, etc.

Figure 12:
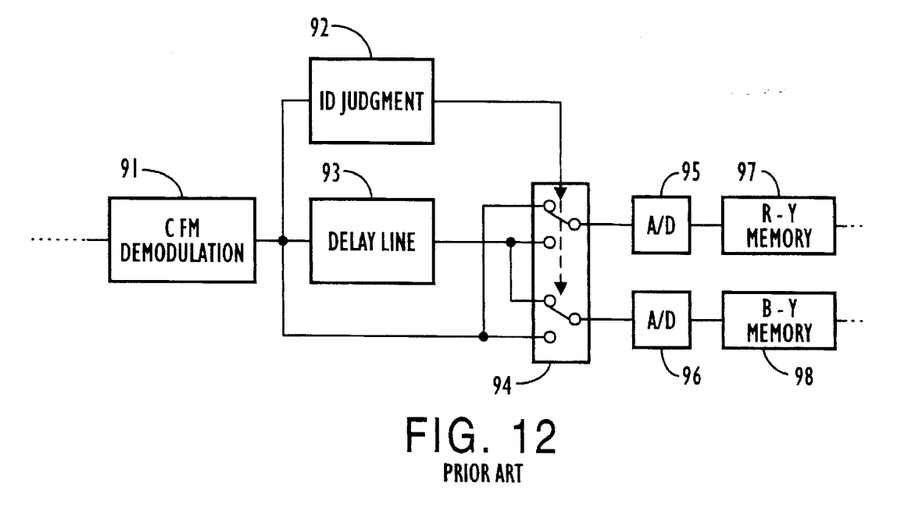
FIG. 12 is a block diagram of a known synchronizing apparatus.

To this end, memories (RAM 97 and 98) are provided in a conventional reproducing circuit to temporarily store the line-sequential differential color signals LSC, as shown in FIG. 12. One of the color difference signals is delayed by a delay circuit 93 to synchronize the color difference signals R–Y and B–Y which are then written in the respective RAM's. Namely, whether the line-sequential differential color signal LSC which has been demodulated by a color signal FM demodulation circuit 91 is the color signal R–Y or the color signal B–Y is judged by an judging circuit 92. If the line-sequential differential color signal LSC is the color signal B–Y, the latter is delayed by the 1H delay circuit 93 by a period of time corresponding to 1H (i.e., one horizontal scanning period), so that the analog color signal B–Y is converted to a digital signal by an A/D converter 95 (or 96) through a switch circuit 94, in synchronization with the color difference signal R–Y which is outputted at a period of time 1H after the color difference signal B–Y and converted by an A/D converter 96 (or 95). The digital color difference signals R–Y and B–Y are simultaneously written in the R–Y signal memory 97 and the B–Y signal memory 98 at the same addresses thereof, respectively. The color difference signals R–Y and B–Y stored at the same addresses of the memories 97 and 98 are simultaneously read therefrom.

The luminance signal Y and the color signal C have different modulation frequencies (i.e., different carrier frequencies). For example, the modulation frequency of the luminance signal Y is higher than the modulation frequency of the color signal C. Accordingly, when these signals are separated by the color filters, the color signal C is delayed with respect to the luminance signal Y. Consequently, upon reproducing a picture onto a monitor or the like, it is necessary to compensate for the delay so that the color signal C and the luminance signal Y will be simultaneously output (i.e., so that the color signal C and the luminance signal Y will be synchronized).

Figure 13:
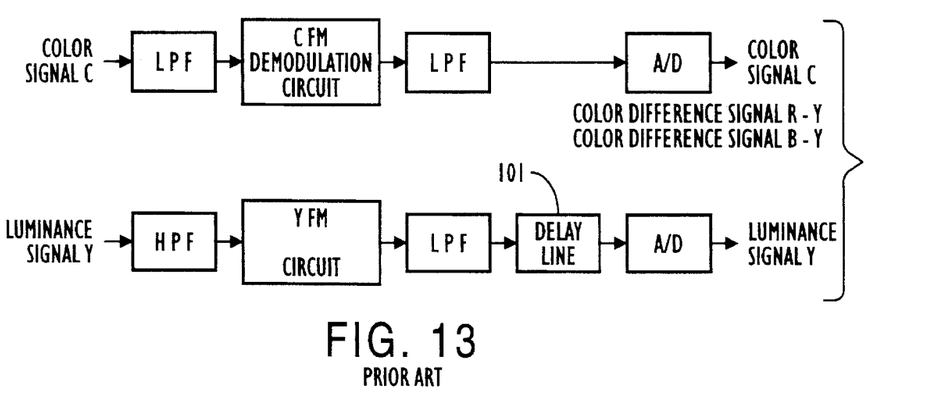
FIG. 13 is a block diagram of a known synchronizing apparatus using a delay line; and, FIG. 14 is a block diagram of a known synchronizing apparatus using memories.

To this end, in a known synchronization circuit, a delay line 101 is provided in the reproduction circuit of the luminance signal Y to delay the transmission of the luminance signal Y and thereby synchronize the luminance signal Y and the color signal C, as can be seen in FIG. 13.

Figure 14:
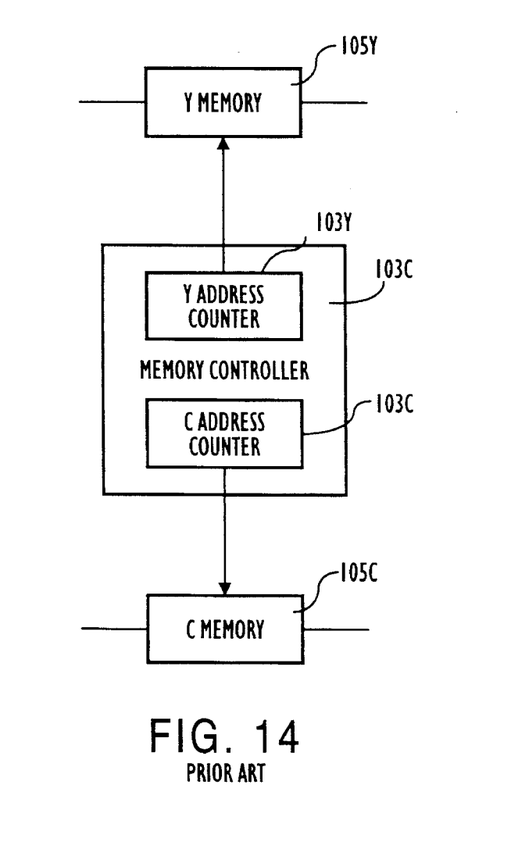

Furthermore, in a known synchronization circuit having memories for storing the color difference signal C and the luminance signal Y therein, as shown in FIG. 14, the luminance signal Y is stored in the luminance signal memory 103Y and the color difference signal C is stored in the color signal memory 103C. When the luminance signals and the color signals, together constituting a single picture plane, are stored, the luminance signals and the color signals corresponding to the same horizontal line and same picture element (i.e., pixel) are successively read from the respective memories 103Y and 103C to synchronize the luminance signals and the color signals. The conventional memory controller 105 which controls the writing and reading operations of the signals in and from the memories includes a Y-address counter 105Y and a C-address counter 105C to control the addresses of the Y memory 103Y and the C memory 103C, respectively.

Accordingly, a primary object of the present invention is to provide a simple synchronizing apparatus and method in which two or more signals (e.g., picture signals including a luminance signal and a color signal), one of which is delayed, can be synchronized without employing a delay circuit.

SUMMARY OF THE INVENTION

To achieve the object mentioned above, according to the present invention, there is provided an apparatus for synchronizing a plurality of signals which constitute a picture signal, wherein the signals include at least two types of signals each having a predetermined time unit, the two types of which are alternately outputted. The apparatus includes separate memory devices for separately storing the two types of signals in a manner such that the writing operation is alternated between a first and second of the separate memory devices so as to provide alternate blank memory areas in the first and second memory devices. Then, the signals of the same type as those written in areas adjacent to the blank memory areas can be written in the blank memory areas. The present invention is also directed to a method for synchronizing a plurality of signals in association with the above described apparatus.

According to another aspect of the present invention, there is provided an apparatus for synchronizing a plurality of signals which constitute a picture signal, a portion of the signals being inputted at a time different than the remaining signals with respect to a predetermined reference time. The apparatus includes separate memory mechanism into which the portion of the signals and the remaining signals are respectively inputted; and, a memory control mechanism for writing the portion of the signals and the remaining signals in the separate memory mechanism at different writing operation commencement positions that are predetermined in accordance with the time difference. The present invention is further directed to a method for synchronizing a plurality of signals in association with the above described apparatus.

The present disclosure relates to subject matter contained in Japanese patent application Nos. HEI 5-83318 and HEI 5-83517 (both filed on Apr. 9, 1993) which are expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
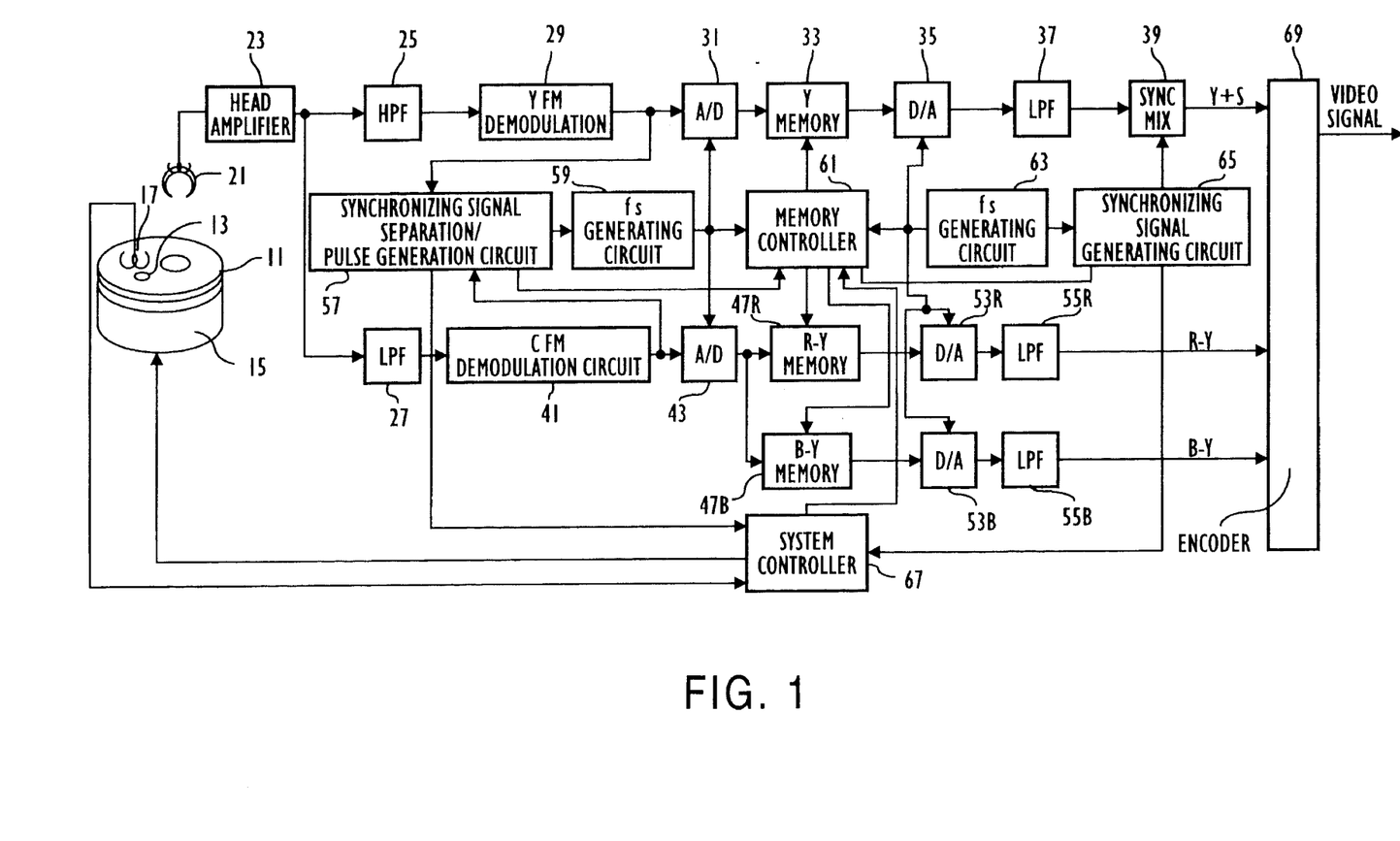
FIG. 1 is a block diagram of a still video apparatus to which the present invention is applied.

FIG. 1 shows a block diagram of a circuit arrangement of a still video apparatus to which the present invention is applied. A magnetic disc 11 is provided with a predetermined recording track format. The FM-modulated luminance signals Y and color signals C (i.e., line-sequential differential color signals LSC) are multi-recorded together with predetermined synchronization signals on recording tracks of the magnetic disk. The color signals C are usually comprised of two color difference signals R–Y and B–Y.

The FM-modulated signals that are multi-recorded on the magnetic disc 11 are read therefrom by a magnetic head 21 and are amplified by a head amplifier 23. The FM-modulated luminance signals Y and the FM-modulated color signals C are then separated by a high bandpass filter 25 and a low bandpass filter 27, respectively.

The luminance signals Y are demodulated by an FM-demodulation circuit (i.e., luminance signal FM-demodulation circuit) 29. The demodulated luminance signals (i.e., analog signals) Y are converted to digital signals by an A/D converter 31. The digital luminance signals are then stored in a luminance signal memory 33.

A synchronization signal separation/pulse generation circuit 57 detects and sends horizontal and vertical synchronization signals contained in the demodulated luminance signals to a memory controller 61 and generates one pulse for each detection. A sampling clock signal generator 59 generates a sampling clock signal fs and memory control clock signals in accordance with the pulses generated by the synchronization signal separation/pulse generation circuit 57. The A/D converter 31 converts the luminance signals to digital signals in synchronization with the sampling clock signal fs. The sampling clock signals fs and memory control clock signals are outputted to the memory controller 61 and a system controller 67. The sampling clock signals fs and memory control clock signals are used to actuate an address counter within the memory controller 61.

The FM-modulated color signals separated by the low bandpass filter 27 is FM-demodulated by an FM-demodulation circuit (i.e., color signal FM-demodulation circuit) 41. The demodulated color signals (i.e., analog signals) C are converted to digital signals by an A/D converter 43 to become line-sequential differential color signals LSC. The color difference signals R–Y and the color difference signals B–Y are then stored in an R–Y memory 47R and a B–Y memory 47B, respectively.

The line-sequential differential color signal LSC includes the color difference signals R–Y and B–Y that are written to and read from the same track of the magnetic disc 11 and are outputted from the A/D converter 43. The line-sequential differential color signals LSC are inputted to the synchronization signal separation/pulse generation circuit 57. The latter outputs a line index signal to the memory controller 61 to discriminate the color difference signal R–Y or B–Y in accordance with the level of the line-sequential differential color signals LSC. The memories 33, 47R and 47B are usually made of silicon memory (i.e., quick access RAM's).

The conversion operation by the A/D converters 31 and 43, and the writing operation by the memories 33, 47R and 47B are controlled by the memory controller 61 in synchronization with the sampling clock signal fs outputted from the sampling clock generator 59.

The memory controller 61 has a vertical address counter and a horizontal address counter. The memory controller 61 controls the memories 33, 47R and 47B by the vertical address counter and the horizontal address counter.

When the storage of the picture signals for one field is completed, the memory controller 61 successively reads the luminance signals Y and the color difference signals R–Y and B–Y from the respective memories 33, 47R and 47B. The luminance signals read from the luminance signal memory 33 are converted to analog signals by a D/A converter 35. Subsequently, the high frequency component thereof is removed by the low bandpass filter 37. Thereafter, the synchronizing signal from the synchronization signal operating circuit 65 is mixed with the luminance signals to be outputted together to an encoder circuit 69.

The color difference signals R–Y and B–Y stored in the RY memory 47R and B–Y memory 47B are read simultaneously with the luminance signals Y, and are then converted to analog signals by respective D/A converter 53R and 53B. The high frequency components of the color difference signals R–Y and B–Y are removed by respective low bandpass filters 55R and 55B. Thereafter, color difference signals R–Y and B–Y are outputted to the encoder circuit 69. The encoder circuit 69 generates and outputs the video signals which are suitable for a monitor or a personal computer, etc., to be connected to the still video camera, from the three inputted signals.

The magnetic disc 11 is rotated at a predetermined speed (e.g., 3600 rpm in the illustrated embodiment) by a spindle motor 15 which is controlled by the system controller 67. The system controller 67 detects the passage of a PG yoke 13 on the magnetic disc 11 through a PG coil 17 to detect one turn of the magnetic disc 11 and control the rotational phase thereof to thereby generally control the rotation of the magnetic disc in accordance with the FG pulses outputted in association with the rotation of the spindle motor 15.

The features of the present invention will be discussed below in more detail, with reference to FIGS. 2 through 5.

Figure 2:
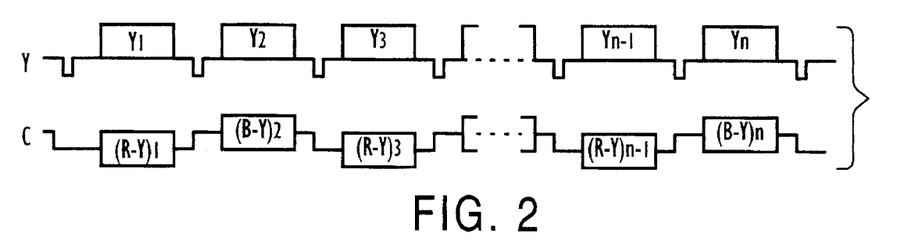
FIG. 2 is a timing chart showing an input state of luminance signals and line-sequential differential color signals R–Y, B–Y.
Figure 3:
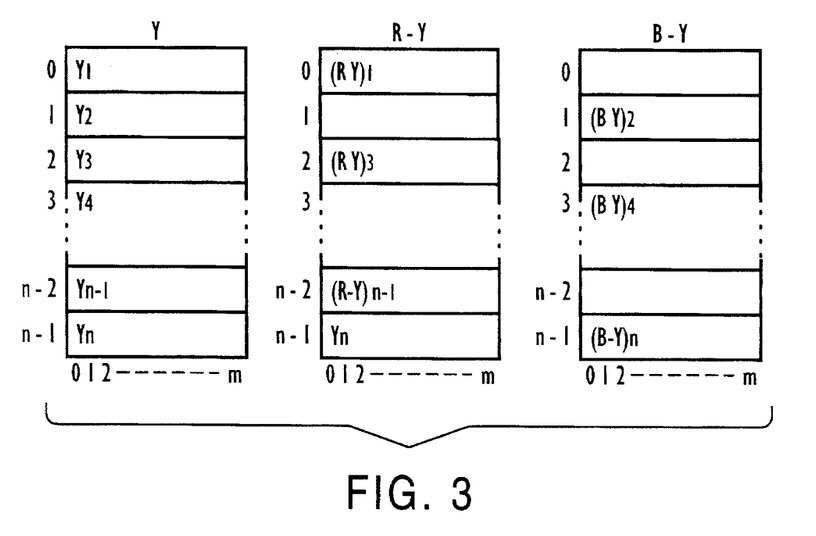
FIG. 3 illustrates the manner in which line-sequential differential color signals R–Y and B–Y are written in a color difference signal memory upon a first reproduction of color signals.
Figure 4:
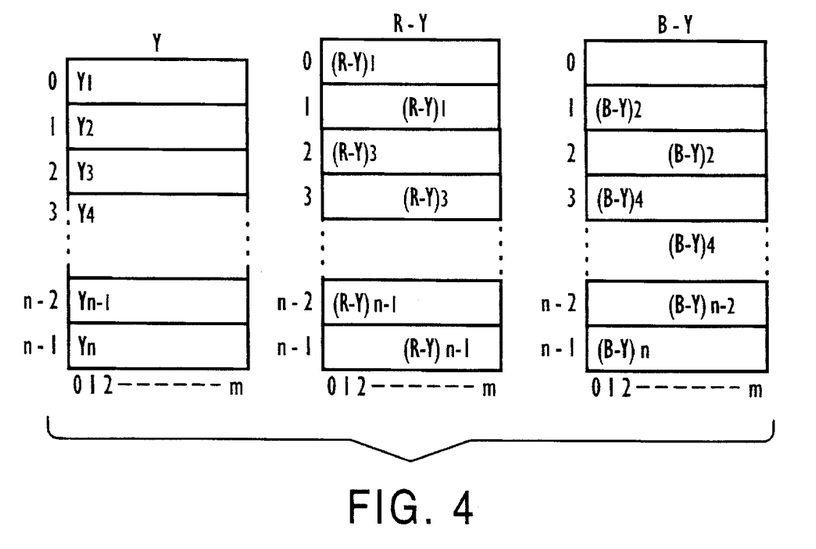
FIG. 4 illustrates the manner in which line-sequential differential color signals R–Y and B–Y are written in a color difference signal memory upon a second reproduction of color signals.

In the illustrated embodiment, the address counter of the memory controller 61 designates the addresses of the three memories 33, 47R and 47B. Upon reproduction of the signals, the luminance signal Y is stored in the memory 33 when the magnetic disc is rotated through one turn. Then, the color difference signals R–Y and B–Y are stored in the order of the output thereof in the R–Y memory 47R and B–Y memory 47B. FIG. 2 shows a time chart of the output of the color difference signals R–Y and B–Y, and FIGS. 3 and 4 schematically show the memory maps of the memories 47R, 47B, 33 and written states of the data. The memories 47R and 47B include horizontal and vertical addresses, and store the corresponding signals for 1H on the line of the same vertical addresses. The luminance memory 33 is similar to the color difference memories 47R and 47B. The horizontal and vertical addresses are designated by the address counter of the memory controller 61. For clarity, in the following discussion, it is assumed that the horizontal and vertical addresses are controlled by a horizontal address counter and a vertical address counter, respectively.

In the line-sequential differential color signal LSC, the color difference signals R–Y and B–Y have different reference levels, as shown in FIG. 2. Consequently, the color difference signals R–Y and B–Y can be discriminated by detecting the reference levels of the signals. The synchronization signal separation/pulse generation circuit 57 generates and outputs the line index signal which is adapted to discriminate the color difference signals R–Y and B–Y in accordance with the reference levels of the signals to the memory controller 61. The memory controller 61 selects the R–Y memory 47R or the B–Y memory 47B in accordance with the line index signal.

Upon commencement of storing, at first the memory controller 61 writes only the luminance signals Y in the associated memory 33 after the first vertical synchronization signal V is detected. Namely, when the horizontal synchronization signal H is detected after the vertical synchronization signal V is detected, the writing of the luminance signal Y in 33 is commenced at the first initial address (i.e., horizontal address 0, vertical address 0) thereof. Every time the luminance signals Y are outputted, the horizontal address counter counts up to write the luminance signals Y for one horizontal line. In other words, when the horizontal synchronization signal H, which represents that the subsequent horizontal line signal is outputted (i.e., the output of the horizontal signals for one line is completed), the vertical address counter counts up and a similar writing operation is commenced after the horizontal address counter is cleared.

The above-mentioned operations are repeated until the second vertical synchronization signal V is outputted, i.e., until the writing of the luminance signals for one track, i.e., one picture plane is completed. Note that, in case of the field recording, the luminance signals for one track (i.e., one field) are recorded, and in case of the frame recording, those for two tracks (i.e., two fields) are recorded. For clarity, the following discussion will be directed to the field recording.

Upon completion of the storing of the luminance signals for the one track, the line-sequential differential color signals LSC are written in the respective memories 47R and 47B during the second and third rotations. In the reproduction during the second rotation, the writing of the line sequential differential color signals LSC is commenced at the first initial address (i.e., horizontal address 0, vertical address 0). If the first line-sequential differential color signal LSC is the color difference signal R–Y, which is discriminated based on the line index signal, as mentioned above, the color difference signal R–Y is written in the R–Y signal memory 47R while the horizontal address counter counts up by one. When the writing of the color difference signal R–Y for one horizontal line is completed, the vertical address counter counts up by one, and the value of the horizontal address counter is returned to an initial value (0). At the same time, the B–Y signal memory 47B is selected, so that the second line-sequential differential color signal LSC, i.e., the color difference signal B–Y is written in the B–Y signal memory 47B.

Upon completion of the writing of the color difference signals B–Y for one horizontal line, the value of the horizontal address counter is returned to the initial value (0), and the vertical address counter counts up by one, so that the color difference signals R–Y are written in the R–Y signal memory 47R for the same line. Similar operations are repeated for one picture plane, so that the color difference signals R–Y and B–Y are written in the R–Y signal memory 47R and the B–Y signal memory 47B every other line, respectively.

When the reproduction and writing during the second rotation are completed, the memory controller 61 carries out the writing at the second initial address (i.e., vertical address 1, horizontal address 0) which corresponds to the first initial address plus one increment of the vertical address during the third rotation. As a result of the writing operation during the third rotation, the signals corresponding to the signals that have been written on the adjacent line are successively written on the blank line, so that the signals are recorded on respective lines of the memories 47R and 47B.

Figure 5:
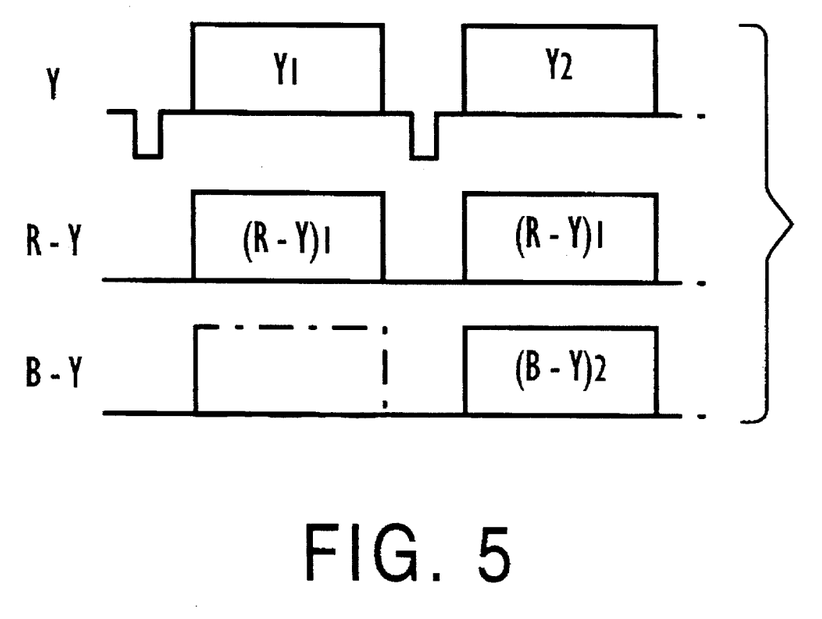
FIG. 5 is a timing chart of luminance signals and line-sequential differential color signals R–Y, B–Y that are synchronized by a synchronizing apparatus, according to the present invention.

Upon completion of the writing operation, the signals at the same address of the luminance signal memory 33, the R–Y signal memory 47R and the B–Y signal memory 47B are successively read therefrom. Consequently, the picture signals are synchronized, as can be seen in FIG. 5.

Figure 6:
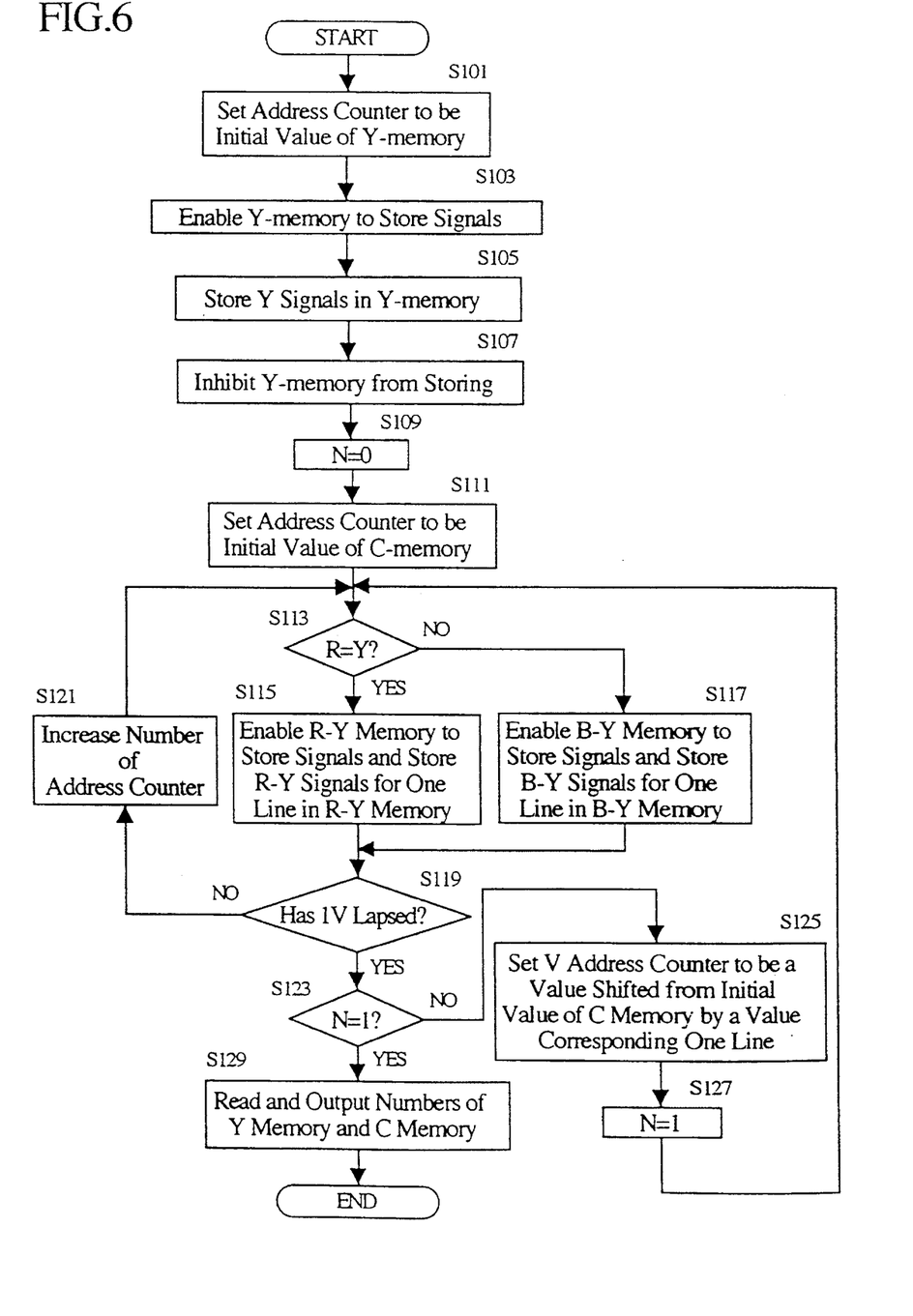
FIG. 6 is a flow chart of a storage operation upon reproduction, according to the present invention.

The memorization operation mentioned above will be further discussed below, with reference to FIG. 6.

The control of the whole apparatus including the control of the spindle motor 15 is effected by the system controller 67. Upon commencement of signal reproduction, the memory controller 61 sets the first initial address of the horizontal address counter and the vertical address counter (step S101) and permits signals to be written to the luminance signal memory 33 (step S103). Thereafter, the luminance signals Y for one picture plane, outputted from the A/D converter 31 are stored in the luminance signal memory 33 (step S105). Note that the luminance signals Y for one track (i.e., one field) are recorded in case of field recording and the luminance signals Y for two tracks (i.e., two fields) are recorded in case of frame recording, as mentioned above.

When the storage of the luminance signals for one field is completed, the writing of the luminance signals in the luminance signal memory 33 is prohibited. Thereafter, flag N is cleared, and the first initial values of the horizontal and vertical address counters are set (steps S107, S109 and S111). Thereafter, whether the color signal outputted from the A/D converter 43 is the color difference signal R–Y is checked in accordance with a line index signal at step S113. If the color signal is the color difference signal R–Y, the same is written in the R–Y signal memory 47R (step S115). When the color difference signals R–Y for one horizontal line are written, the vertical address counter counts up by one increment, and control is returned to step S113 (steps S113, S115, S119 and S121).

If the color signal is the color difference signal B–Y at step S113, those for one horizontal line are stored in the B–Y signal memory 47B. Thereafter, the vertical address counter counts up by one increment, and control is returned to step S113 (steps S113, S117, S119 and S121). Note that in the illustrated embodiment, the color signal of each horizontal line contains only the color difference signals R–Y or B–Y. Accordingly, the color difference signals R–Y and B–Y, which are recorded in alternate horizontal scanning periods (1H), can be successively reproduced.

As a result of the above-mentioned operations, predetermined patterns of color difference signals R–Y and B–Y are stored (i.e., written) in the memories 47R and 47B, as shown in FIG. 3.

Upon completion of the memorization of the color difference signals for one field, whether flag N is "1" is checked. It should be recalled that, for the first operation, flag N has been cleared at step S109. Consequently, control proceeds to step S125 to write the second color difference signals. At step S125, the second initial values of the horizontal and vertical address counters are set. Thereafter, the color difference signals R–Y and B–Y are written in the respective R–Y and B–Y signal memories 47R and 47B, similar to the above-mentioned operations for the first field (steps S113-S121).

Thus, predetermined patterns of pairs of color difference signals R–Y and B–Y are stored in the respective memories 47R and 47B, as shown in FIG. 4.

The completion of writing of the color difference signals for one field is detected by the output of the vertical synchronization signal V (step S119). If the second writing operation is completed, flag N is set to "1" at step S127, and control proceeds to steps S129 from step S123. Consequently, the luminance signals Y and the color difference signals R–Y and B–Y are simultaneously read from the luminance signal memory 33 and the color difference signal memories 47R and 47B, in synchronization with the sampling pulse fs' generated by the sampling pulse generator 63 at step S129. Thus, the luminance signals Y and the color difference signals R–Y and B–Y are synchronized, as shown in FIG. 5.

The order in which the memory controller 61 writes the luminance signals Y and the color difference signals R–Y and B–Y in memorys 33, 47R, 47B is optional.

The digital luminance signal read from the luminance signal memory 33 is converted to an analog signal by the D/A converter 35, and the high frequency component thereof is removed by the low bandpass filter 37. Thereafter, a synchronization signal is mixed with the luminance signals by the synchronization signal mixing circuit 39 to obtain a luminance signal Y+S which is then outputted to the encoder circuit 69. The digital color difference signals R–Y and B–Y read from the respective memories 47R and 47B are converted to analog signals by the respective D/A converters 53R and 53B, and the high frequency components thereof are removed by the low bandpass filters 55R and 55B. Thereafter, the color difference signals R–Y and B–Y are outputted to the encoder circuit 69.

The encoder circuit 69 encodes the luminance signal Y+S and the color difference signals R–Y and B–Y, and outputs the same to the monitor, etc., as a composite video signal.

As can be understood from the foregoing, according to the present invention, when the picture signals for one picture plane are reproduced, the luminance signals Y are written in the luminance signal memory 33 by the first rotation of the magnetic disc 11. In the second rotation of the magnetic disk, the color difference signals R–Y and B–Y, which are recorded in alternate horizontal scanning periods (1H), are successively reproduced and written in the corresponding color difference signal memories 47R and 47B. The writing operation alternates between memories 47R and 47B such that the R–Y signals are written at every other line of the R–Y memory (47R) and the B–Y signals are written at every other line of the B–Y memory (47B). Furthermore, In the third rotation of the magnetic disc 11, the color difference signals R–Y and B–Y are successively written on blank lines (i.e., skipped lines) of the corresponding color difference signal memories 47R and 47B. Upon completion of the writing operation, the signals at the similar addresses of the memories 33, 47R and 47B are simultaneously read. Thus, the luminance signals Y and the color difference signals R–Y and B–Y are synchronized.

Although the above discussion has been applied to a still video apparatus, the present invention is not limited thereto.

The following discussion will be addressed to a second embodiment of the present invention (FIGS. 7 through 10).

Figure 7:
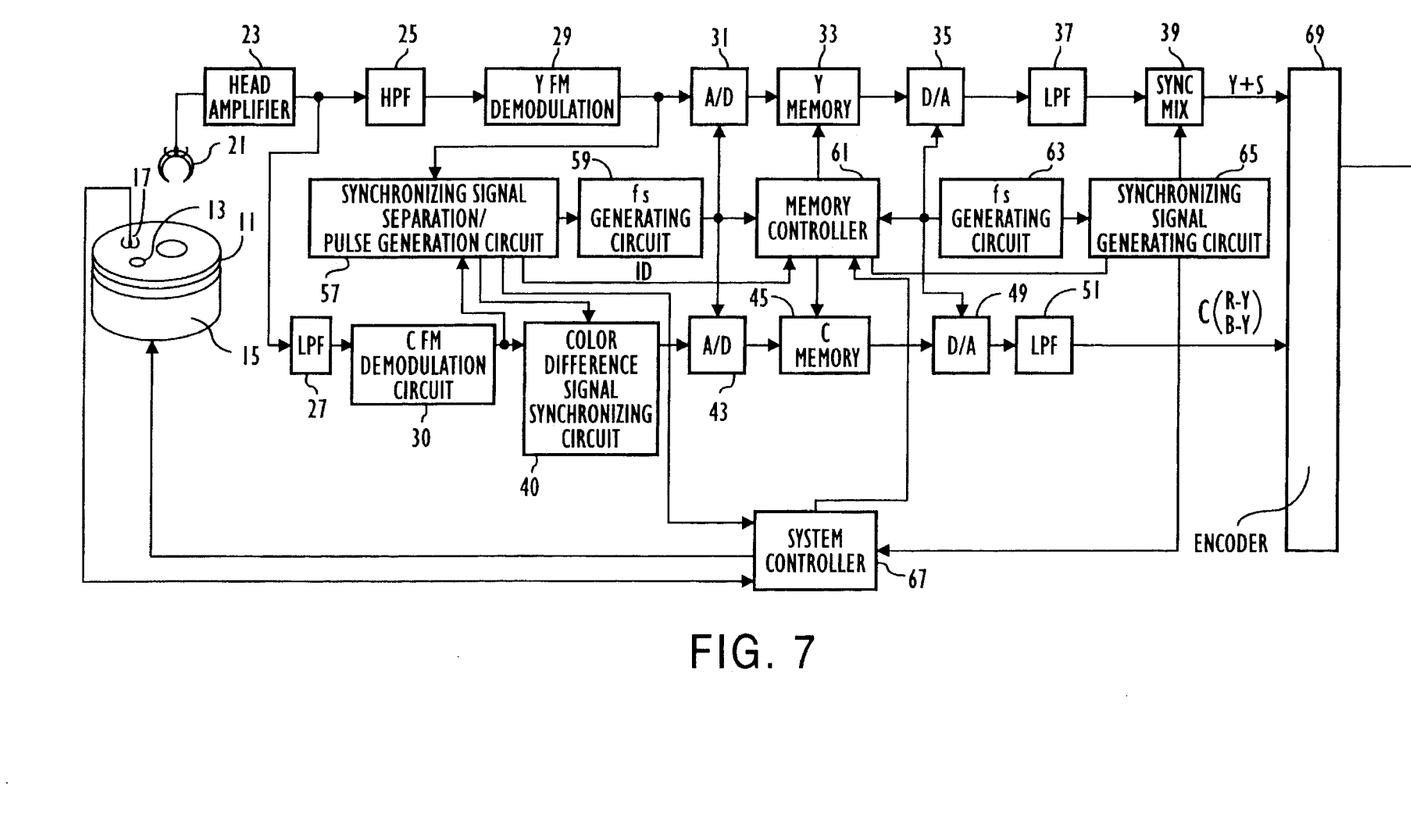
FIG. 7 is a block diagram of a still video apparatus having a picture signal synchronizing apparatus, according to the present invention.

FIG. 7 shows a block diagram of a still video apparatus to which the second embodiment of the present invention is applied. The still video apparatus shown in FIG. 7 is basically identical to that shown in FIG. 1. The elements corresponding to those in FIG. 1 are designated with like reference numerals. Accordingly, no explanation is given for these elements.

Upon reproduction, the FM-modulated color signals extracted by the low bandpass filter 27 are demodulated by the color signal FM-demodulation circuit 30 and outputted to the color difference signal synchronizing circuit 40. In the second embodiment, the color signal C is the line-sequential differential color signal LSC containing the color difference signals R–Y and B–Y that are recorded in alternate horizontal scanning periods (1H). The demodulated color signal C is inputted to the synchronization signal separation/pulse generation circuit 57. Thereafter, the synchronization signal separation/pulse generation circuit 57 outputs the line index signal ID, which is used to detect the color difference signal R–Y or B–Y in accordance with the level of the line-sequential differential color signal LSC, to the memory controller 60 and the color difference signal synchronizing circuit 40.

The color difference signal synchronizing circuit 40 outputs the two color difference signals R–Y and B–Y which are synchronized in accordance with the line index signal ID. The synchronized color difference signals R–Y and B–Y are successively written in the respective memories of a color difference signal memory 45 at the second writing positions (i.e., second initial addresses). The color difference signal memory 45 includes a memory for the color difference signal R–Y and a memory for the color difference signal B–Y. The two memories have an identical address format, so that the color difference signals are written in and read from the two memories at the same addresses designated by the memory controller and the address counters. In view of the identical function and operation of the two memories, the color difference signals R–Y and B–Y are not distinguished from one another in FIGS. 7 and 11. For clarity, the color difference signals R–Y and B–Y are referred to in the following discussion as a color signal C which is processed by a single signal processor.

The conversion of data by the A/D converters 31 and 43 and the storage of data in the memories 33 and 45 are controlled by the memory controller 60 in synchronization with the sampling clock signal fs outputted from the sampling clock generator 59. The memory controller 60 simultaneously reads the corresponding luminance signals Y recorded in the memory 33 and color signals C recorded in the memory 45 at similar addresses upon completion of writing picture signals for one field in the memories 33 and 45. Thus, the luminance signals Y and the color signals C are synchronized.

The luminance signal Y read from the luminance signal memory 33 is converted to an analog signal by the D/A converter 35, and the high frequency component thereof is eliminated by the low bandpass filter 37. Thereafter, the luminance signal is mixed with the synchronizing signal and outputted to the encoder circuit 69. The color signal C is converted to an analog signal by the D/A converter 49. The high frequency component of the color signal C is removed by the low bandpass filter 51. Thereafter, the color signal is outputted to the encoder circuit 69.

The encoder circuit 69 produces and outputs a composite video signal compatible with a monitor or a personal computer, etc., to be connected to the still video apparatus, based on the luminance signal Y and the two color difference signals R–Y and B–Y.

As can be understood from the foregoing, according to the second embodiment, upon reproduction, the luminance signal Y is written in the memory 33 at the first initial address thereof during the first rotation of the magnetic disc (i.e., first reproduction). Thereafter, the color signals C (i.e., R–Y and B–Y) are written in the memory 45 at the second initial address during the second rotation of the magnetic disc 11 (i.e., second reproduction).

Figure 8:
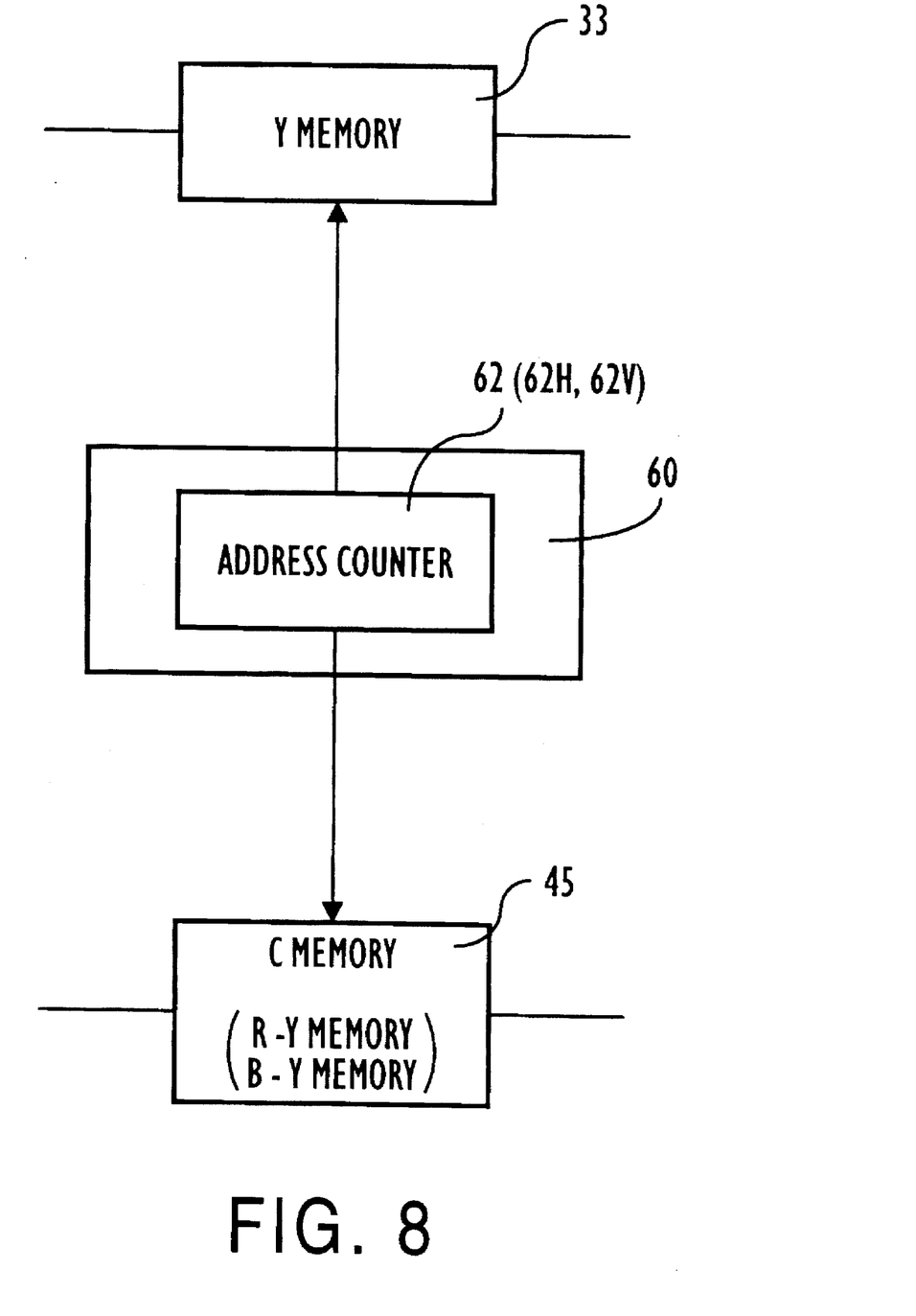
FIG. 8 is a block diagram of memories and corresponding control system.
Figure 9:
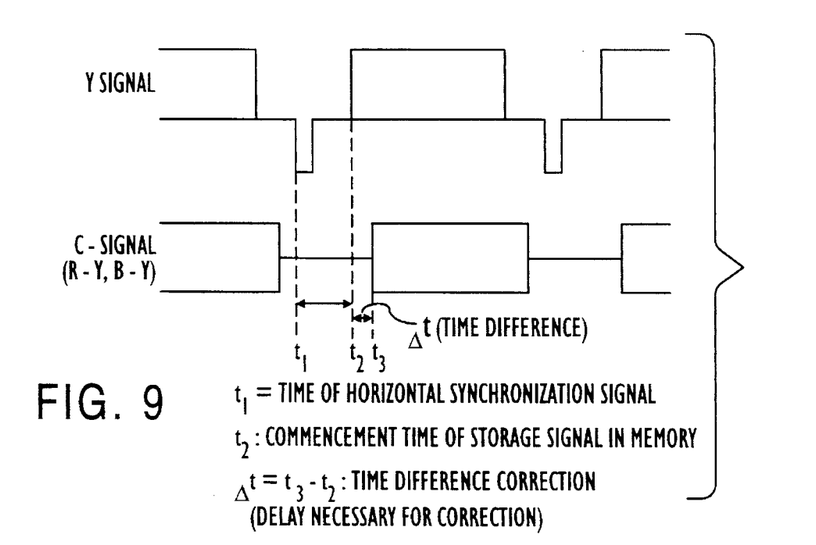
FIG. 9 is a timing chart showing an input state of a luminance signal and a color signal.
Figure 10:
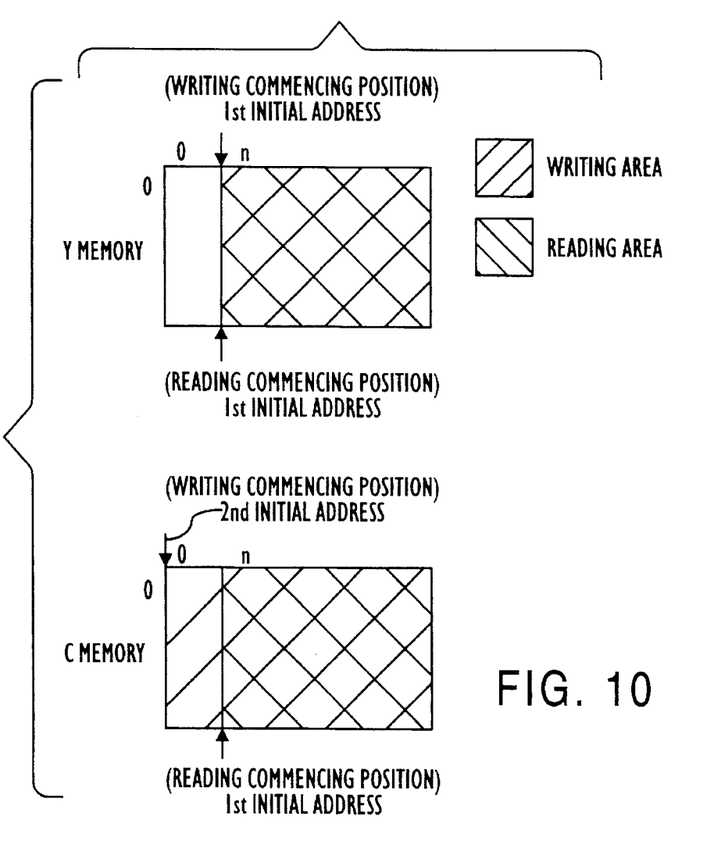
FIG. 10 shows memory maps of luminance signals and color signals.

FIG. 8 shows the memories 33 and 45 and the memory controller 60, and FIG. 9 shows a timing chart of the output of the luminance signal Y outputted from the luminance signal FM-demodulation circuit 29 and the color signals C outputted from the color signal FM-demodulation circuit 30. FIG. 10 shows data storage patterns in the memories 33 and 45. In the second embodiment, the addresses of the two memories 33 and 45 are designated by a single address counter 62 of the memory controller 60.

As can be seen from FIG. 9, while the luminance signal Y and the color signal C are predetermined to be outputted at a time $t_2$, after time $t_1$ at which the horizontal synchronization signal (i.e., pulse) is outputted, an inherent time lag exists in the output of the color signal C with respect to the luminance signal Y. Consequently, the color signal C is outputted at a time $\Delta t$ after time $t_2$. Accordingly, the initial count number n of the horizontal address counter 62H is set at a value corresponding to the delay time $\Delta t$ with respect to the luminance signal Y. Namely, the delay time $\Delta t$ is identical to the time necessary for writing the luminance signals Y at addresses 0 through n (n being a positive integer). The value of the initial count number n is appropriately determined, based on the delay time $\Delta t$ and the sampling clock frequency upon A/D conversion.

The memories 33 and 45 are provided with horizontal and vertical addresses, wherein the signals corresponding to the sampling data for $(1H+\Delta t)$ are stored on the line of the same vertical address. The horizontal and vertical addresses are designated by the address counter 62 of the memory controller 60. For clarity, it is assumed that the address counter 62 is comprised of a horizontal address counter 62H and a vertical address counter 62V.

In the memory controller 60 of the present invention, when a reproduction operation is commenced, the first vertical synchronization signal V is detected. Thereafter, only the luminance signal Y is written. Namely, when the horizontal synchronization signal H is detected after the vertical synchronization signal V is outputted, the writing of the luminance signal Y only is commenced at an address corresponding to the initial count number n (i.e., horizontal address n; vertical address 0) in a predetermined time t. The horizontal address counter 62H counts, up every time the luminance signals Y are outputted to write the luminance signals Y for one horizontal line. When the subsequent horizontal synchronization signal H is outputted, the vertical address counter 62V counts up, and the horizontal address counter 62H is set to the initial count number n. Thereafter, a similar writing operation is commenced.

The above-mentioned operations are repeated until the subsequent vertical synchronization signal V is outputted, i.e., until the writing of data for one track and one picture plane is completed. Consequently, the luminance signals Y are written at the first address, corresponding to the address of the initial count number n of the horizontal address counter 62H, and the addresses subsequent thereto, as shown in FIG. 10. The data area in which the luminance signals Y are written is hatched by oblique lines inclined towards the upper right direction.

Upon completion of the storage of the luminance signals Y by the first rotation (i.e., first reproduction) of the magnetic disc 11, the color signals C are written by the second rotation of the magnetic disc (second reproduction). The writing of the color signals C is commenced at an address corresponding to the second count number n of the vertical address counter 62V (i.e., horizontal address 0, vertical address 0). The memory controller 60 successively writes the color signals while the horizontal address counter 62H counts up. When the writing of the color signals for one horizontal line is completed, the memory controller 60 causes the vertical address counter 62V to count up, so that the second count number n of the horizontal address counter 62H is set to carry out a writing operation similar to the one described above.

When the writing operations are repeated for one picture plane, the color signals C are written in the color signal memory 45. Note that there is no signal written at the addresses 0 through (n−1). Namely, no signal outputted in the period of time between time $t_2$ and time $t_3$ is written at addresses 0 through (n−1), and the color signals C are actually written at the horizontal address n and the subsequent addresses.

When the writing operation is completed, the luminance signals and the color signals stored at the same addresses of the respective memories 33 and 45 are successively read. Reading begins with the reading commencement address of each line (i.e., first initial address and the horizontal address n). Consequently, the luminance signals Y and the color signals C are synchronized.

Figure 11:
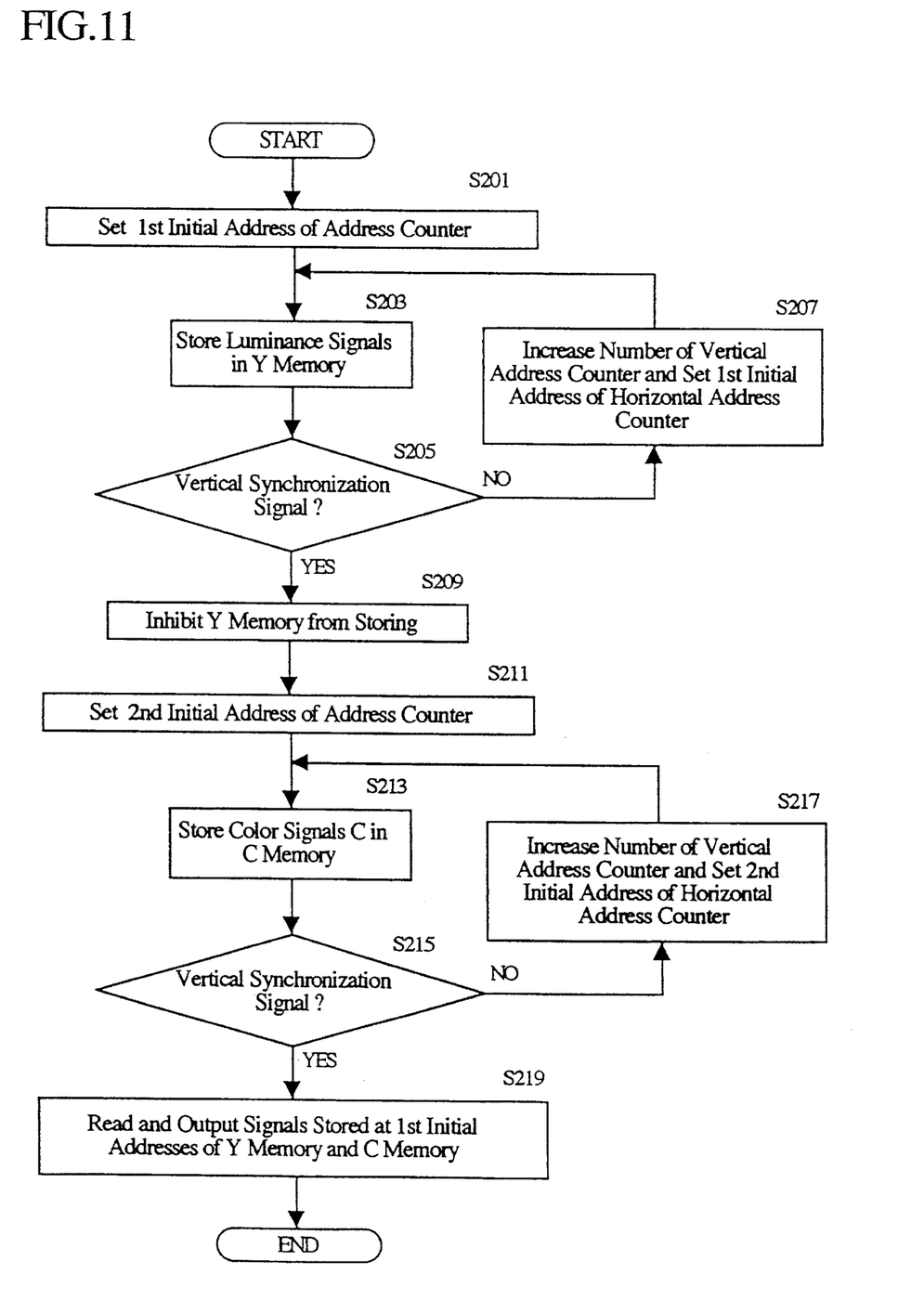
FIG. 11 is a flow chart of a synchronization operation, according to the present invention.

The memorization operation mentioned above will be further discussed below, with reference to FIG. 11. The control of the whole apparatus, including the control of the spindle motor 15, is effected by the system controller 67.

Upon commencement of the reproduction, the memory controller 60 sets the first initial address of the address counter (i.e., horizontal address counter 62H and the vertical address counter 62V) (step S201), and the luminance signal memory 33 enables the signals to be written (step S203). Thereafter, the luminance signals Y outputted from the A/D converter 31 are successively stored in the luminance signal memory 33. That is, the writing (i.e., storage) of the luminance signals Y in the luminance signal memory 33 is commenced after the lapse of a predetermined time (a fly-back time) t after the output of the horizontal synchronization signal H. When the storage of the luminance signals for one horizontal line is completed, the vertical address counter 62V counts up by one, and the first initial address of the horizontal address counter 62H is set. Thereafter, the luminance signals for the subsequent horizontal line are written in the memory (steps S203, S205, and S207).

The above-mentioned writing operations are repeated for one picture plane (steps S203, S205 and S207). Namely, the luminance signals are recorded for one track (i.e., one field) in case of field recording and are recorded for two tracks (i.e., two fields) in case of frame recording. In the illustrated embodiment applied to field recording, the luminance signals for one track are written during one rotation of the magnetic disc.

When the storage of the luminance signals Y for one field is completed, the writing of luminance signals into the luminance signal memory 33 is prohibited, and the second initial address of the horizontal and vertical address counter 62H and 62V is set (steps S209 and S211). When the horizontal synchronization signal H is outputted, the writing of the color signals C in the memory 45 is commenced at the second initial address in a predetermined time t (step S213). When the color signals C for one horizontal line are written, the vertical address counter 62V counts up by one increment, and the second initial address 0 of the horizontal address counter 62H is set. After that, control is returned to step S213 (steps S213, S215 and S217). Similar writing operations are repeated until the vertical synchronization signal V is outputted, i.e., for one picture plane.

Thus, predetermined patterns of luminance signals Y and color signals C are stored in the respective memories 33 and 45, as shown in FIG. 10. In FIG. 10, the areas in which data is recorded (i.e., writing areas) are indicated by oblique lines inclined towards the upper right corner of the page. The areas indicated by oblique lines inclined downwardly towards the lower right corner of the page are used to read the signals. Consequently, the areas that are cross-hatched are used to write and read the signals.

When the writing of the luminance signals Y and the color signals C is completed, the memory controller 60 simultaneously reads the luminance signals and the color signals recorded at similar addresses of the respective memories 33 and 45, in synchronization with the sampling clock fs' generated by the sampling clock generator 63 at step S219. The reading begins at the first initial address. Thus, the luminance signals Y and the color signals C are synchronized.

As may be understood from the above discussion, according to the second embodiment of the present invention, the the storing operation of the outputted color signals C is begun in advance of the luminance signals Y so that the signals can be processed by a single address counter. Furthermore, according to the second embodiment, since the delay in output of the color signals C with respect to the luminance signals Y is absorbed in a manner such that the writing operation commencement address number of the luminance signals Y is set at the initial count number n which corresponds to the delay time $\Delta t$, and the reading operation of the luminance signals Y is commenced at the same address number, the luminance signals Y and the color signals C are synchronized.

The present invention is not limited to the above-mentioned embodiments in which the luminance signal Y and the color signals C are synchronized, and can be applied to, for example, a synchronization circuit of two color difference signals R–Y and B–Y.

In the present invention discussed above, when the writing of the signals into the respective memories 33, 45, 47R and 47B are completed, the reproduction of the signals from the magnetic disc 11 is stopped, and the signals are read from these memories and outputted through the encoder circuit 69. The output speed can be varied depending on the imaging apparatus to be connected. If the imaging apparatus is a TV, the signals for one picture plane are read and outputted at 1/30 sec., and if the imaging apparatus is a personal computer, the signals for one picture plane are read and outputted at a speed corresponding to the transfer speed thereof.

As can be seen from the foregoing, according to the present invention, since the signals which are inputted or outputted at different times are written at different writing operation commencement addresses of the respective memories corresponding to the timing difference, and since, upon completion of the writing operation, the signals stored at the same addresses of the respective memories are simultaneously read therefrom in a synchronous manner, the need for a delay circuit is eliminated. Moreover, since the writing operations of the signals at different addresses are not temporally overlapped, and the signals stored at the same address of the respective memories are simultaneously read, the synchronization of the signals can be realized by the memory controller having a single writing address and reading address control function.

In addition to the foregoing, since a provision is made for a plurality of memories which separately store different kinds of signals that are successively inputted, and a memory control means for successively writing the picture signals inputted at different times into predetermined data areas of the respective memories and for writing the picture signals that are the same as those written in the predetermined data areas into the adjacent blank areas of the respective memories, the picture signals can be synchronized without using a delay circuit.

We claim:

1. An apparatus for synchronizing a plurality of signals forming a picture signal, wherein said signals include at least two types of signals each having a predetermined time unit which are alternately outputted, comprising:

separate memory means for separately storing said two types of signals at predetermined time units; and memory control means for successively writing said two types of signals in a manner such that a writing operation is alternated between a first memory means and a second memory means of said separate memory means so as to provide alternate blank memory areas in said first and second memory means, wherein same type signals as those written in areas adjacent to said blank memory areas can be written in said blank memory areas.

2. The apparatus of claim 1, wherein said picture signal further comprises a third type of signal that is successively outputted, said separate memory means further comprising a third memory means in which said third type of signal is written at said predetermined time units, and wherein said memory control means controls said writing operation of said third type of signal in a manner such that said third type of signal is written in successive memory areas of said third memory means.

3. The apparatus of claim 2, wherein said memory control means simultaneously reads different types of signals written in similar memory areas of said separate memory means upon completion of a writing of said signals.

4. The apparatus of claim 2, wherein each of the memory means comprises a RAM.

5. The apparatus of claim 2, wherein said picture signal comprises a still picture signal having a luminance signal and a color signal that are each inputted at a horizontal scanning time unit.

6. The apparatus of claim 5, wherein said third type of signal comprises said luminance signal and said first and second types of signals comprise color difference signals R–Y and B–Y which constitute a color signal and which are stored in respective memory areas.

7. The apparatus of claim 6, wherein said color difference signals R–Y and B–Y are alternately inputted at every other horizontal scanning time unit.

8. The apparatus of claim 7, further comprising reading means for reading said luminance signals and said color signals recorded on a magnetic disc.

9. The apparatus of claim 8, wherein said luminance signals and said color signals for one picture plane are multi-recorded on one track of said magnetic disc.

10. The apparatus of claim 9, further comprising separating means for separating said luminance signal and said color signal read by said reading means; A/D converters which convert said separated luminance signal and separated color signal to digital signals; and means for judging whether said color signal is a color difference signal R–Y or a color difference signal B–Y.

11. The apparatus of claim 10, wherein said separate memory means comprise a Y memory which stores said luminance signal; an R–Y memory which stores said color difference signal R–Y; and a B–Y memory which stores said color difference signal B–Y.

12. The apparatus of claim 11, further comprising means for reproducing said picture signal.

13. The apparatus of claim 12, wherein said memory control means controls said writing operation of said color difference signals R–Y and B–Y of said picture signal reproduced by said reproducing means so as to write said color difference signals R–Y and B–Y during a first rotation of said magnetic disc into predetermined alternate memory areas of corresponding R–Y and B–Y memory means at successive horizontal scanning time units, said memory control means controlling said writing operation of said color difference signals R–Y and B–Y of said picture signal reproduced by said reproducing means during a second rotation of said magnetic disc into skipped blank memory areas of corresponding R–Y and B–Y memory means at successive horizontal scanning time units.

14. The apparatus of claim 12, wherein said memory control means controls said writing operation of said luminance signal of said picture signal reproduced by said reproducing means so as to write said luminance signal during a first rotation of said magnetic disc into predetermined memory areas of said corresponding Y memory at successive horizontal scanning time units controls the, said memory control means controlling said writing operation of said color difference signals R–Y and B–Y of said picture signal reproduced by said reproducing means so as to write said color difference signals R–Y and B–Y during a second rotation of said magnetic disc into predetermined alternate memory areas of corresponding R–Y and B–Y memory means at successive horizontal scanning time units, said memory control means controlling said writing operation of said color difference signals R–Y and B–Y of said picture signal reproduced by said reproducing means during a third rotation of said magnetic disc into skipped blank memory areas of corresponding R–Y and B–Y memory means at successive horizontal scanning time units.

15. The apparatus of claim 14, wherein each of said Y, R–Y and B–Y memory areas comprises a RAM.

16. The apparatus of claim 15, wherein said predetermined memory areas of said Y, R–Y and B–Y memory means have similar addresses.

17. The apparatus of claim 16, wherein said memory control means prevents a storage of B–Y or R–Y color difference signals in said B–Y or R–Y memory means when said judging means judges said R–Y or B–Y color difference signal is stored in said R–Y or B–Y memory means, respectively.

18. The apparatus of claim 14, wherein said memory control means simultaneously reads said luminance signals, said color difference signals R–Y and said color difference signals B–Y stored at similar addresses of said Y, R–Y and B–Y memory means in which said picture signals for one picture plane are stored to synchronize said luminance signals Y and said color difference signals R–Y and B–Y.

19. The apparatus of claim 18, wherein said control means includes an address counter and said control means controls write and read addresses of said Y, R–Y and B–Y memory means in accordance with said address counter.

20. A method for synchronizing a plurality of signals forming a picture signal, in which the plurality of signals include at least two types of signals each having a predetermined time unit, the at least two types of signals being alternately outputted, and wherein the at least two types of signals are successively and separately stored at predetermined time units in separate memory means, comprising the steps of:

writing the at least two types of signals in a manner such that a writing operation is alternated between a first and second of the separate memory means so as to provide alternate blank memory areas in the first and second memory means;

writing signals of the same type as those written in areas adjacent to the blank memory areas in the blank memory areas; and, simultaneously reading the at least two types of signals written in similar memory areas of the separate memory means upon completion of the writing of the at least two types of signals.

21. The method of claim 20, wherein the at least two signals include a third type of signal that is successively outputted, and wherein the third type of signal is successively stored at the predetermined time units in a third memory means of the separate memory means, comprising the steps of:

writing the at least two types of signals in a manner such that the writing operation is alternated between the first memory means and the second memory means of the separate memory means so as to provide alternate blank memory areas in the first memory means and the second memory means;

writing signals of the same type as those written areas adjacent to the blank memory areas in the blank memory areas;

writing the third type of signal in successive memory areas of the third memory means; and simultaneously reading the different types of signals written in similar memory areas of the separate memory means upon completion of the writing of the signals.

22. An apparatus for synchronizing a plurality of signals forming a picture signal, a portion of said plurality of signals being inputted at a time different than remaining signals with respect to a predetermined reference time, comprising:

separate memory means into which a portion of said plurality of signals and said remaining signals are respectively inputted; and memory control means for writing said portion of said plurality of signals and said remaining signals in said separate memory means at different writing operation commencement positions that are predetermined in accordance with said time difference.

23. The apparatus of claim 22, wherein, after said plurality of signals are written in said memory means, said memory control means simultaneously reads said plurality of signals from said separate memory means beginning at a predetermined reference position.

24. The apparatus of claim 23, wherein said plurality of signals comprise luminance signals Y and color signals C that are successively inputted at every horizontal line.

25. The apparatus of claim 24, wherein said color signals C are delayed with respect to said luminance signals Y.

26. The apparatus of claim 24, wherein said memory means comprises memory areas in which signals corresponding to a sum of one horizontal scanning period and a time difference for at least a single picture plane can be written.

27. The apparatus of claim 24, wherein each of said Y and C memory areas comprises a RAM.

28. The apparatus of claim 27, wherein predetermined memory areas of said Y and C memory areas have similar addresses.

29. The apparatus of claim 28, said control means further comprising an address counter, said control means controlling write and read addresses of said Y memory means, a R–Y memory means and a B–Y memory means by said address counter.

30. The apparatus of claim 29, further comprising reading means for reading luminance signals and color signals from a magnetic disc on which luminance signals and color signals are recorded.

31. The apparatus of claim 30, wherein said luminance signals and said color signals for one picture plane are multi-recorded on one track of said magnetic disc.

32. The apparatus of claim 31, further comprising means for separating said luminance signals and said color signals read by said reading means, and A/D converter means for converting said separated luminance signals and color signals to digital signals.

33. The apparatus of claim 32, wherein said memory control means successively and separately writes said luminance signals for one picture plane and said color signals for one picture plane.

34. A method for synchronizing a plurality of signals forming a picture signal, a portion of the plurality of signals being inputted at a time different than a remaining portion of said plurality of signals with respect to a predetermined reference time, wherein separate memory means are provided into which said portion of the plurality of signals and the remaining portion are respectively inputted, comprising the steps of:

writing the portion of the plurality of signals in a first memory means of the separate memory means at a first writing operation commencement position;

writing the remaining portion in a second memory means of the separate memory means at a second writing operation commencement position different than the first writing operation commencement position, wherein the first and second writing operation commencement positions are predetermined in accordance with a time difference; and, simultaneously reading the plurality of signals from the separate memory means beginning at a same reference position after the plurality of signals are written to the memory means.

* * * * *

UNITED STATES PATENT AND TRADEMARK OFFICE
CERTIFICATE OF CORRECTION

PATENT NO. : 5,528,380
DATED : June 18, 1996
INVENTOR(S) : K. SATO et al.

It is certified that error appears in the above-indentified patent and that said Letters Patent is hereby corrected as shown below:

At column 13, line 64 (claim 14, line 7), change "units controls the," to ---units,---.

Signed and Sealed this

Twenty-eighth Day of January, 1997

Attest:

BRUCE LEHMAN

Attesting Officer    Commissioner of Patents and Trademarks